United States Patent [19]

Cross

[11] 4,078,756

[45] Mar. 14, 1978

[54] CLAMP-ON ALL-PURPOSE POLE

[76] Inventor: James M. Cross, 27379 Dutcher Ck. Rd., Cloverdale, Calif. 95425

[21] Appl. No.: 713,015

[22] Filed: Aug. 9, 1976

[51] Int. Cl.² ........................................... F16M 13/00
[52] U.S. Cl. ................................. 248/226.4; 248/512
[58] Field of Search .......... 248/226 A, 226 B, 226 R, 248/226 C, 512, 278, 279, 274, 314; 240/DIG. 5; 211/69.1, 69.5, 69; 47/41.13

[56] References Cited

U.S. PATENT DOCUMENTS

| 972,480 | 10/1910 | Southwick | 248/226 A X |
| 2,673,771 | 3/1954 | Krewson | 248/287 X |
| 2,948,407 | 8/1960 | Wiszuk | 248/262 X |
| 3,768,202 | 10/1973 | Wheelock | 211/60 R X |

FOREIGN PATENT DOCUMENTS

| 991,041 | 9/1951 | France | 47/41.13 |
| 852,563 | 7/1949 | Germany | 248/226 A |
| 440,580 | 12/1967 | Switzerland | 248/226 A |
| 418,082 | 10/1934 | United Kingdom | 248/226 A |

Primary Examiner—J. Franklin Foss
Attorney, Agent, or Firm—Misegades, Douglas & Levy

[57] ABSTRACT

A telescopic pole having a clamp at its base end so that it may be attached to any supporting object and including a universal adjustable joint at the junction of the pole base and the clamp so that the pole may be inclined at any desired angle, and the upper end of the pole being fitted with a hollow plastic sphere perforated with a series of small diametrically arranged openings for various objects that may be inserted therethrough in order to be supported from the pole combination structure.

1 Claim, 4 Drawing Figures

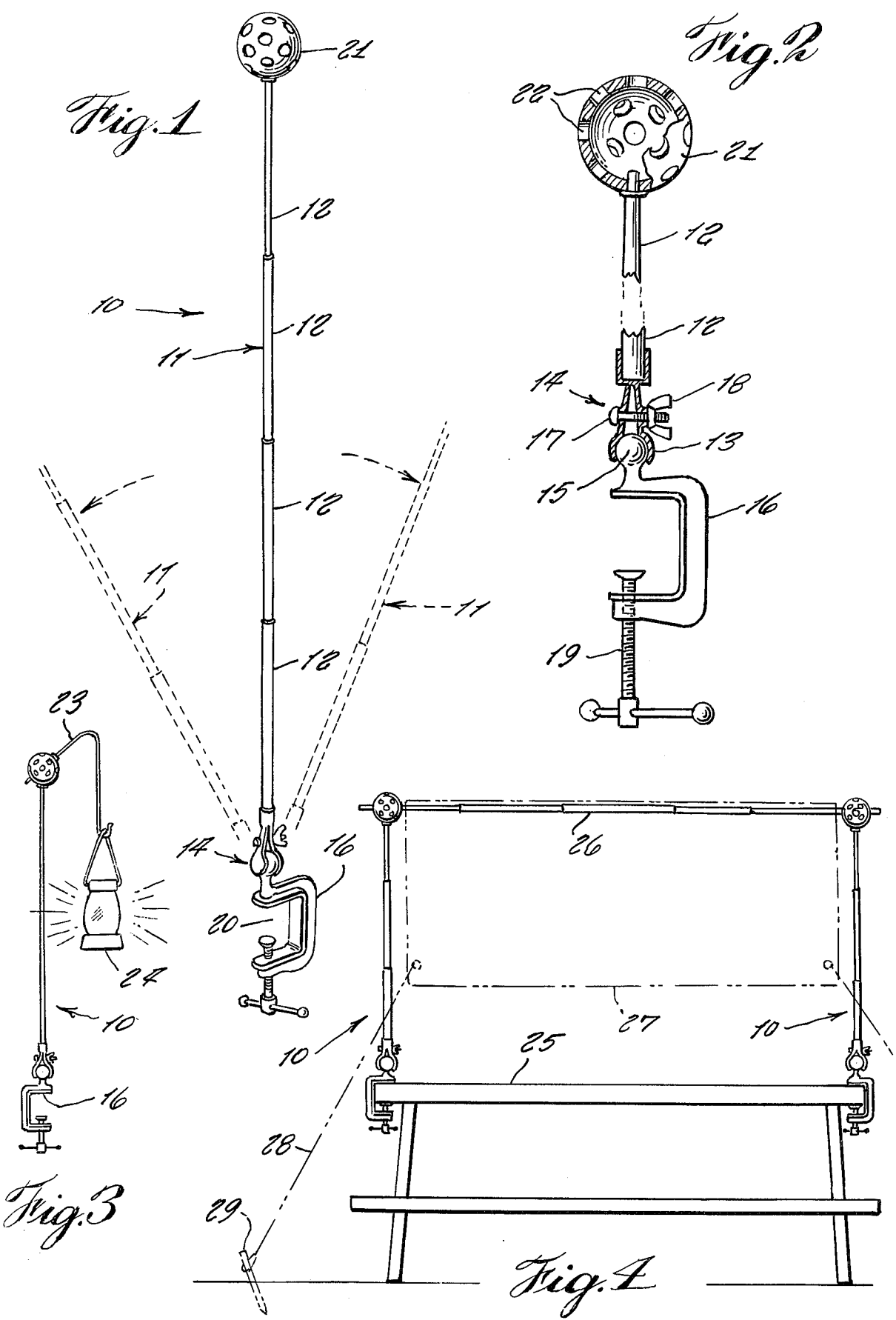

CLAMP-ON ALL-PURPOSE POLE

CROSS REFERENCES TO RELATED PRIOR INFORMATION

The present invention is an improvement and a combination of elements such as clamps, telescopic rods, bolts, wing nuts, and a aperatured spherical means, all arranged to provide a clamp-on all-purpose pole support structure.

BRIEF SUMMARY OF THE INVENTION

This invention relates generally to support poles for multi-functional uses, and more particularly the invention is directed to a telescopic pole having a clamp at its base and a universal joint adjustably disposed so that the telescopic pole can be selectively oriented, and a hollow plastic sphere means disposed at the other end of the telescopic pole for arrangement to provide support therefrom of any of several various objects, such as hooked bars, other telescopic rods, and the like.

In summary the invention is a clamp-on mounted telescopic pole structure being adjustably secured by a universal joint mounting at one end and having disposed at the other end appropriate sphere means from which various supported objects may be securably attached. Further, a split socket means with a take up screw, a ball means and a wing nut may be provided for providing the adjustably secured universal joint so that the telescopic rod may be selectively disposed in a given orientation.

The sphere means is provided so that there are diametrically disposed a pair of openings through the spheres for receiving any of various supported objects in the form of telescopic rods or the like. There is also the teaching of the present invention wherein a pair of poles support a telescopic rod between a pair of sphere means.

FIELD OF THE INVENTION

A primary object and advantage of the present invention is to provide a pole combination that is readily and easily clamped on one end to a supporting object and which in turn serves to hold in secure relation at the other any of several objects that may be disposed for mounting by a sphere means.

Another object of the present invention is to provide a clamp-on pole which among its many uses may serve to hold an outdoor lantern over a picnic table, retain a weather protective canopy over objects out-of-doors by being clamped to a bench, table, tree, branch fence, side of a truck, car or trailer, and which further may serve as a clothes line and the like.

Yet another object of the present invention is to provide a clamp-on, all purpose pole combination structure which is quick and easy to adjust in length, tilting angle and direction, due to the concepts, advantages, and results achieved in the present invention. A further and additional object of the present invention is to provide a pole structure, adaptable for use in pairs, which can be used inside a home, factory or office as well as out-of-doors by families, sportsmen, and tourists.

BRIEF DESCRIPTION OF THE SEVERAL VIEWS OF THE DRAWING

The above and other objects and advantages of the invention will become apparent upon full consideration of the following detailed description and accompanying drawings in which:

FIG. 1 is a perspective view of a clamp-on, all-purpose pole combination structure within the teaching and purview of the best mode of the present invention;

FIG. 2 is a side elevation view partially broken away in part and partially in cross-sectional view of the structure of FIG. 1;

FIG. 3 is a side view of reduced size showing the pole supporting structure of the present invention in one of its uses;

FIG. 4 is a side elevation view of a pair of poles used in combination for supporting a canopy or like structure over a picnic table within another preferred embodiment and use of the present invention.

DETAILED DESCRIPTION OF THE PREFERRED EMBODIMENT

Referring now to the drawings in detail, there is shown a clamp-on, all-purpose pole 10 according to a preferred embodiment and the best mode of the present invention which includes a telescopic rod 11 made of frictionally extending telescopic sections 12. The lowermost section terminates to a permanently attached split socket member 13 coupled to a universal joint 14, the socket containing ball element 15 being integrally formed upon an end of a C-clamp 16. The socket member 13 is frictionally secured under tension by means of a take-up bolt 17 fitted with a wing nut 18 which when tightened provides for the frictional engagement described above. The C-clamp 16 is provided with a tension applying threaded member or screw 19 for locking the clamp onto any object unto which the C-clamp may fit as shown in that portion of the C-clamp identified as the mouth 20 thereof.

The uppermost rod section 12 described above has at its upper end a permanently fixed hollow plastic sphere 21 secured thereto by conventional means and the sphere means is provided with a series of perforated openings 22 diametrically arranged through the sphere means, so that each opening is aligned with a diametrically opposite opening and these are disposed in pairs so that support means, hook means, elongated objects and the like such as rods, telescopic rods and the like, may extend through these pairs of aperatures or perforated openings 22, as shown in FIGS. 3 and 4. The pairs of openings may be made in disaligned with the center of the sphere means, or other pairs than those diametrically disposed, may be similarly used in disaligned fashion so that the sphere means 21 may be used for holding several rods at the same time without the rods passing through the center of the sphere means 21.

Not by way of limitation and as exemplarly only, an example of the operative discriptive use of the present invention provides that a pole 10 as shown in FIG. 3 may be provided for holding a hooked rod 23 from which a lantern 24 is supported in hanging relation. FIG. 4 in turn, shows a pair of poles 10, clamped to opposite or distal ends of a picnic table 25 and extending through diametrically arranged aperatures or openings 22, of the sphere means 21 is a telescopic rod 26 secured therein. The rod 26 may be such diameter that it is frictionally engaging within the openings 22. Over the rod 26 may be disposed a canopy 27 in draped relation and the canopy corners may then be secured by lines 28, to ground stakes 29 so as to protect picnic food, hunters, sportsmen, and the like from inclement weather, or for other comparable uses.

In summary there is thus shown a fully adjustable clamp-on all-purpose pole combination structure according to the new, novel and unique fashion of the present invention to provide for numerous, different and improved purposes as are set forth and described herein.

What is claimed is:

1. A clamp-on all-purpose combination structure comprising a telescopic pole having a plurality of inter-telescoping sections, one endmost of said sections being adjustably secured to a universal joint mounted upon an end of a C-clamp adaptable for attachment to a supporting object, each opposite endmost section of said pole being affixed to one of a pair sphere means from which various various supported objects may be securably attached, said universal joint including a split socket means, a ball means mounted on said C-clamp, a take-up screw fitted with a wing nut fur being secured onto said ball means, said sphere means comprising a hollow plastic member having a plurality of diametrically arranged openings therethrough for receiving said various supported objects in the form of telescopic rods, and a hooked rod is disposed for mounting from said sphere means.

* * * * *